(12) United States Patent
Ikeda et al.

(10) Patent No.: US 6,311,322 B1
(45) Date of Patent: Oct. 30, 2001

(54) PROGRAM REWRITING APPARATUS

(75) Inventors: Takahiro Ikeda, Tokyo; Takuya Shirahata, Yokohama, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/263,195

(22) Filed: Mar. 5, 1999

(30) Foreign Application Priority Data

| Mar. 9, 1998 | (JP) | 10-056674 |
| Dec. 21, 1998 | (JP) | 10-362863 |

(51) Int. Cl.[7] .................................................. G06F 9/45
(52) U.S. Cl. ........................................................ 717/1
(58) Field of Search .................... 717/1, 11; 711/100, 711/103

(56) References Cited

U.S. PATENT DOCUMENTS

| 5,477,264 | 12/1995 | Sarbadhikari et al. | 348/231 |
| 5,590,303 | * 12/1996 | Shibata et al. | 395/427 |
| 5,608,910 | * 3/1997 | Shimakura | 395/670 |
| 5,657,301 | * 8/1997 | Yoshikawa et al. | 369/30 |
| 5,748,967 | * 5/1998 | Nakamura et al. | 717/11 |
| 5,826,211 | * 10/1998 | Kobayashi | 701/115 |
| 5,844,796 | * 12/1998 | Araki | 364/191 |
| 6,108,598 | * 8/2000 | Sumitani | 701/29 |
| 6,223,336 | * 4/2001 | Tojima | 717/1 |

* cited by examiner

*Primary Examiner*—Kakali Chaki
*Assistant Examiner*—Wei Zhen

(57) ABSTRACT

The normal program storing portion stores a normal program containing a control procedure of the program rewriting apparatus and a spare rewriting program. In a first period, the control device overwrites the received normal and spare rewriting programs on the normal program storing portion. In a second period different from the first period, the control device copies the spare rewriting program overwritten on the normal program storing portion to the rewriting program storing portion in accordance with the overwritten normal program.

16 Claims, 10 Drawing Sheets

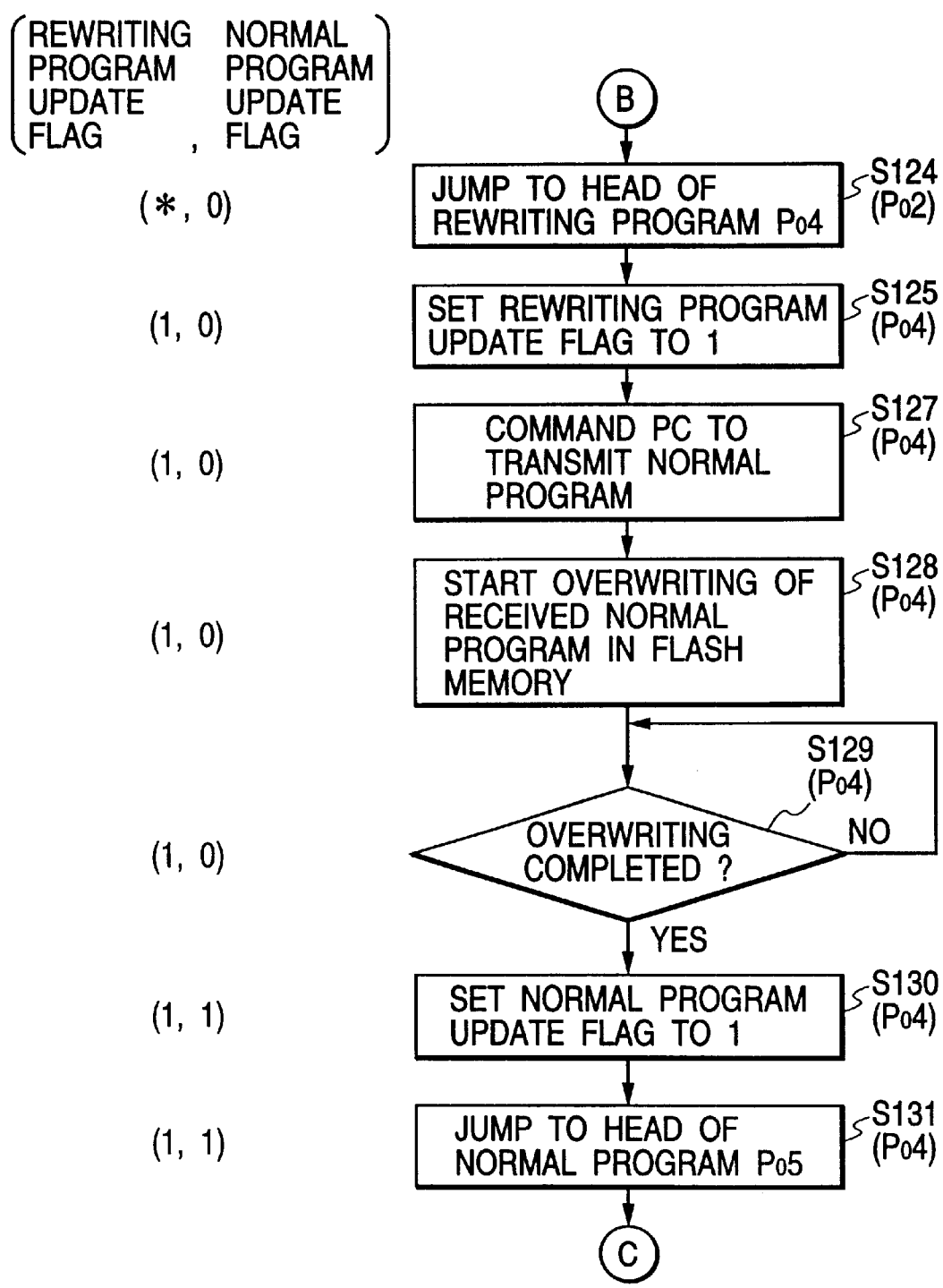

PROGRAM REWRITING APPARATUS

BACKGROUND OF THE INVENTION

1. Field of the Invention

The present invention relates to a program rewriting apparatus built-in an electronic machinery, in particular to a program rewriting apparatus for rewriting a program for controlling the operation of the electronic machinery.

2. Related Background Art

The program for controlling the operation of the electronic machinery is normally stored in MASKROM, EPROM, EEPROM, flash memory or the like provided in the electronic machinery. These memories are used for only read. With the EPROM, EEPROM, flash memory or the like, however, a program stored in the memory can be rewritten electrically by using a special device. CPU (Central Processor Unit) provided in the electronic machinery controls individual sections inside the electronic machinery in accordance with a program stored in the above memory.

Recently in electronic machineries such as a peripheral equipment (scanner, printer, modem or the like) or mother board of a PC (Personal Computer), the need for rewriting a program stored in the above memory arises in order to add a function to the electronic machinery or amend the fault occurring in the electronic machinery. In such cases, the following two methods are used to omit the labor of replacing the above memory inside electronic machinery with the memory storing an updated program.

(1) An electrically rewritable memory such as EEPROM or flash memory is used as the memory for storing the program. When a program stored in a memory is to be rewritten, the electronic machinery downloads a modified program from the PC. Then, the electronic machinery executes the rewrite of a program in itself. In this manner, the addition of a function or the amendment of a fault in the electronic machinery is realized.

(2) Only the boot part of a program (initializing part for communication or the like) is stored in the MASKROM or EPROM. At the time of turning on power of the electronic machinery, only the communication function between the PC and the electronic machinery becomes operable. Every time starting the driver software of the above electronic machinery on the PC side, a program for controlling the electronic equipment is downloaded onto RAM in the electronic machinery by the communication function. And in accordance with the program downloaded onto the RAM, a CPU of the electronic machinery controls individual sections inside the electronic machinery. In the case of adding a function or amending a fault of the electronic machinery, an up-to-date driver software is set in the PC. Thus, the electronic machinery can store an updated program for controlling itself in the RAM. Namely, it is not necessary to change the memory of the electronic machinery that stores the program. In this way, the addition of a function or amendment of a fault in the electronic machinery is realized.

An undated program for adding a function or amending a fault in both methods mentioned above, is distributed to users via a communication line from a PC communication or from a home page in the internet. Accordingly, a user is not required to resend electronic machinery to its maker or to take it to the service window. Furthermore, the person in charge at the maker need not decompose the electronic machinery to exchange the memory.

The prior arts mentioned above have the following problems:

First, in case of the above method (1), the power supply can run down so that and the write of a program can fail in the course of writing a program into the EEPROM or flash memory. Furthermore, the writing into the EEPROM or flash memory can fail for some causes. In this case, the program whose rewrite proceeds to midway cannot be matched between the pre-rewrite and the post-rewrite portions as a whole program. Consequently, the program ends in runaway and cannot operate normally.

The electronic machinery falling into the above status disables a program to be rewritten by a user. Accordingly, the user must resend the electronic machinery to the maker or take the electronic machinery to the service window. And, a person of the maker in charge must decompose the electronic machinery to exchange the memory.

Secondly, in case of the above method (2), a program of the boot portion, written in the MASKROM or EPROM, cannot be rewritten by the download from a PC. Thus, if the addition of a function or the amendment of a fault is required in a program of the boot portion, the user must resend the electronic machinery to the maker or take the electronic machinery to the service window. And, a person of the maker in charge must decompose the electronic machinery to exchange the memory.

SUMMARY OF THE INVENTION

It is one object of the present invention to present a program rewriting apparatus permitting the user to execute the rewrite again if the rewrite of a program ends in failure due to power cut or for any other cause during the rewriting process.

It is another object of the present invention to present a program rewriting apparatus permitting the user to rewrite any portion of a program.

The program rewriting apparatus according to a first aspect of the present invention comprises: a normal program storing portion for storing a normal program containing the control procedure of the equipment incorporating the program rewriting apparatus and a spare rewriting program; a rewriting program storing portion for storing a rewriting program including of the receiving procedure for receiving a normal program and a spare rewriting program from an external device and the overwrite procedure for overwriting the received normal program and spare rewriting program over the normal program storing portion; and a control device for executing the overwrite of the normal program and spare rewriting program in accordance with the receiving and overwriting procedures of the rewriting program in a first period and for copying the spare rewriting program written over the normal program storing portion to the rewriting program storing portion in accordance with the normal program in a second period different from the first period.

In this way, with a program rewriting apparatus according to the first aspect of the present invention, the normal program and the spare rewriting program received from an external device are written over the normal program storing portion in the first period. Besides, the spare rewriting program written over the normal program storing portion is copied to the rewriting program storing portion in the second period.

Consequently, if overwrite of the normal program storing portion ends in failure for a cause such as the power cut of electronic machinery during the first period, operation proceeds as follows: the rewriting program (pre-rewrite program) stored in the rewriting program storing portion is initiated and the electronic machinery receives the normal program and the spare rewriting program from the external device. And, the received normal and spare rewriting programs are normally overwritten over the normal program storing portion.

Alternately, if the copy of the spare rewriting program to the rewriting program storing portion ends in failure for a cause such as power cut of the electronic machinery during the second period, operation proceeds as follows: the normal program (post-rewrite program) is again initiated and the spare rewriting program is copied. Thereby, the rewriting program storing portion is normally overwritten.

As described above, a program rewriting apparatus according to the first aspect of the present invention executes the overwrite of the normal program storing portion and that of the rewriting program storing portion at different timing. Thus, this program rewriting apparatus permits a user to execute the rewrite again if the rewrite of a program ends in failure due to power cut or for any other cause during the rewriting process. In addition, this program rewriting apparatus permits the user to rewrite any portion of the program.

With a program rewriting apparatus according to the present invention, it would be preferable that the control device be so arranged as to set the update record of the normal program in response to the completion of overwriting the normal program and the spare rewriting program. In this case, by referring to the update record of the normal program, it can be confirmed whether or not the rewrite of the normal program storing portion is completed.

With a program rewriting apparatus according to the present invention, it would be preferable that the control device be so arranged as to execute the overwrite of the normal program storing portion in accordance with the reception and overwrite procedures of the rewriting program if it is discriminated that no update record of the normal program is set. In this case, the control device can receive the normal program and the spare rewriting program from the external device to execute the overwrite of the normal program storing portion if it is discriminated that the normal program storing portion is not updated.

With a program rewriting apparatus according to the present invention, it would be preferable that the control device be so arranged as to discriminate whether or not the update record of the normal program has been set, at the time of initialization of the equipment incorporating the program rewriting apparatus, thus capable of detecting that the equipment incorporating the program rewriting apparatus failed in overwriting the normal program for any cause during the previous running.

With a program rewriting apparatus according to the present invention, it would be preferable that the control device be so arranged as to set the update record of the rewriting program in response to the completion of copying the spare rewriting program to the rewriting program storing portion. In this case, by referring to the update record of the rewriting program, it can be confirmed whether or not the rewrite of the rewriting program storing portion is completed.

With a program rewriting apparatus according to the present invention, the control device may be so arranged as to copy the spare rewriting program overwritten over the normal program storing portion to the rewriting program storing portion in accordance with the normal program if it is discriminated that no update record of the rewriting program is set.

With a program rewriting apparatus according to the present invention, if so arranged as to discriminate whether or not the update record of the rewriting program has been set, at the time of the initialization of the equipment incorporating the program rewriting apparatus, the control device can detect that the equipment incorporating the program rewriting apparatus failed in overwriting the rewriting program for any cause during the previous running.

A modification of a program rewriting apparatus according to a first aspect of the present invention comprises: a normal program storing portion for storing a normal program containing the control procedure of the equipment incorporating the program rewriting apparatus; a rewriting program storing portion for storing a rewriting program including the receiving procedure for receiving the normal program from an external device and the overwrite procedure for overwriting the received normal program over the normal program storing portion; and a control device for executing the update of the stored content of the normal program storing portion in accordance with the rewriting program and the update of the stored content of the rewriting program storing portion in different periods.

With this modification of program rewriting apparatus, the control device executes the update of the stored content of the normal program storing portion and the update of the stored content of the rewriting program storing portion in different periods. If the rewrite of a program ends in failure on account of power cut during the rewrite of the program or for any other cause, a user can execute the rewrite again. In addition, use of this program rewriting apparatus permits a user to rewrite any portion of the program.

A program rewriting apparatus according to a second aspect of the present invention comprises: a normal program storing portion for storing a normal program containing the control procedure of the equipment incorporating the program rewriting apparatus; a rewriting program storing portion for storing a rewriting program including the receiving procedure for receiving the normal program from an external device and the overwrite procedure for overwriting the received normal program over the normal program storing portion; and a control device for executing the overwrite of the above normal program in accordance with the receiving and overwrite procedures of the rewriting program in a first period and for receiving the above rewriting program from the external device and overwriting the received rewriting program over the rewriting program storing portion on the basis of the above normal program in a second period different from the first one.

With this program rewriting apparatus, the normal program received from an external device is overwritten over the normal program storing portion in the first period. The rewriting program received from an external device is overwritten over the rewriting program storing portion in the second period. Consequently, even if overwrite of the normal program storing portion ends in failure for a cause such as the power cut of electronic machinery building-in the program rewriting apparatus during the first period, no trouble occurring in prior art apparatuses takes place. Namely, the rewriting program stored in the rewriting program storing portion is free from damages. Thus, the electronic machinery is enabled to receive the normal program from the external device by referring to the rewriting program. And, the overwrite of the received normal program over the normal program storing portion is implemented.

Furthermore, even if overwrite of the rewriting program storing portion ends in failure for a cause such as the power cut of electronic machinery building-in the program rewriting apparatus during the second period, no trouble occurring in prior art apparatuses takes place. Namely, the normal program stored in the normal program storing portion is free from damages. Thus, the electronic machinery is enabled to receive the rewriting program from the external device by referring to the normal program. And, the overwrite of the received rewriting program over the rewriting program storing portion is implemented.

In addition, this program rewriting apparatus can rewrite both the normal program and the rewriting program.

With a program rewriting apparatus according to the second aspect of the present invention, if the control device is so arranged as to set the update record of the normal program in response to the completion of overwriting the normal program, it can be confirmed whether or not the rewrite of the normal program storing portion is completed by referring to the update record of the normal program.

With this program rewriting apparatus, it would be preferable that the control device be so arranged as to receive the normal program from the external device and overwrite the received normal program over the normal program storing portion in accordance with the receiving and overwriting procedures of the rewriting program on discriminating that no update record of the normal program is set. In this case, the control device can receive the normal program from the external device to execute the overwrite of the normal program storing portion if it is discriminated that the normal program storing portion is not updated.

With this program rewriting apparatus, it would be preferable that the control device be so arranged as to discriminate whether or not the update record of the normal program has been set at the initialization of the equipment incorporating the program rewriting apparatus, because such an arrangement make it detectable that the equipment incorporating the program rewriting apparatus failed in overwriting the normal program for any cause during the previous running.

With a program rewriting apparatus according to the second aspect of the present invention, if so arranged as to set the update record of the rewriting program in response to the completion of overwriting the rewriting program over the rewriting program storing portion, the control device can confirm whether or not the rewrite of the rewriting program storing portion has been completed, by referring to the update record of the rewriting program.

With this program rewriting apparatus, the control device may be further so arranged as to discriminate whether or not the update record of the rewriting program is present and then receive the rewriting program from the external device and overwrite the received rewriting program over the rewriting program storing portion by referring to the normal program on discriminating that no update record of the rewriting program is set.

With this program rewriting apparatus, if the control device is so arranged as to discriminate whether or not the update record of the rewriting program has been set at the initialization of the equipment incorporating the program rewriting apparatus, the equipment incorporating the program rewriting apparatus can detect that it failed in overwriting the rewriting program for any cause during the previous running.

BRIEF DESCRIPTION OF THE DRAWINGS

FIG. 10 is a flowchart showing the operation at the initialization of a film scanner shown in FIG. 1 according to the second embodiment.

DETAILED DESCRIPTION OF THE PREFERRED EMBODIMENTS

Figure 1:
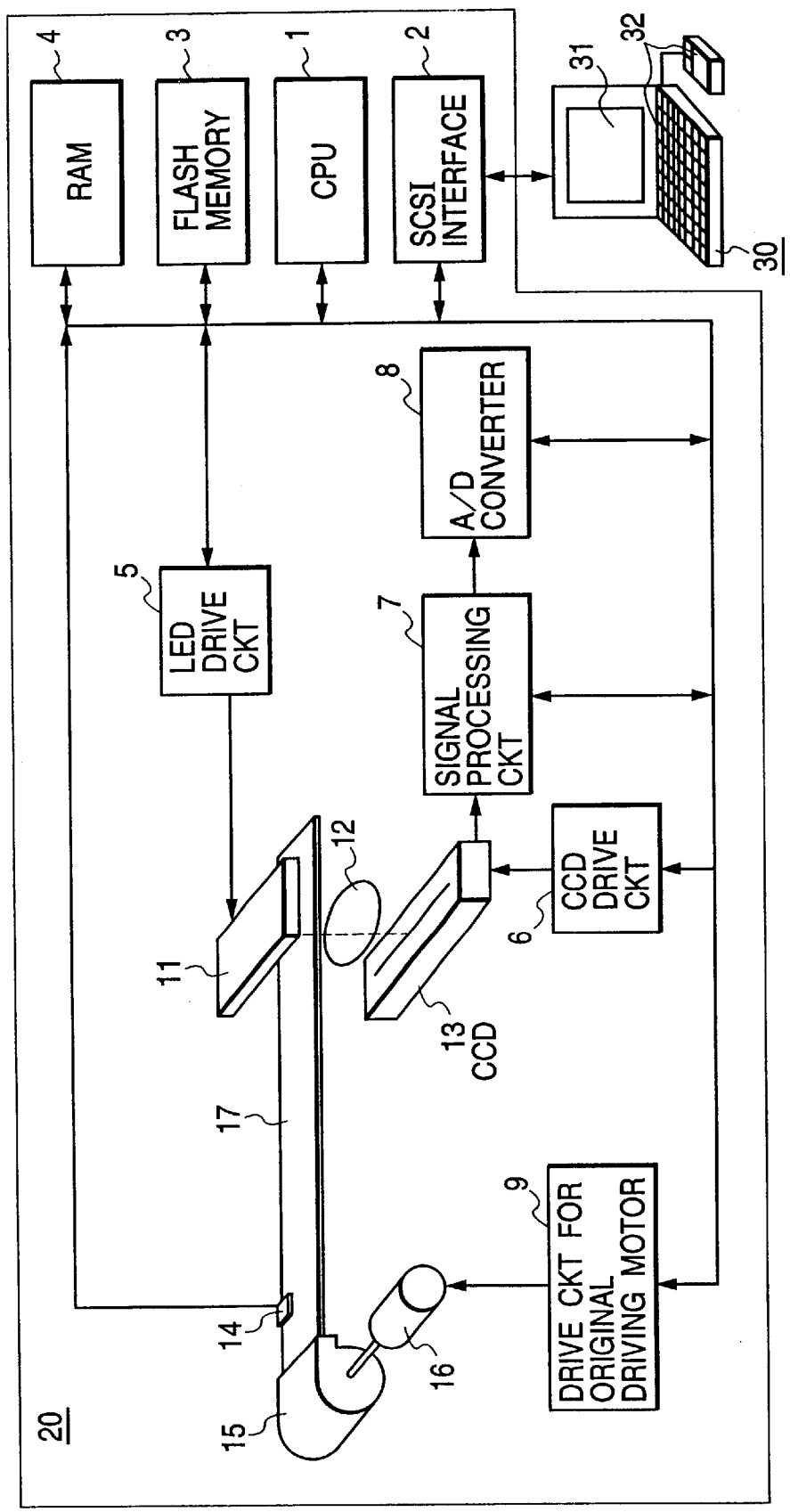
FIG. 1 is a block diagram showing one example of an image reading system composed of a film scanner and a PC.

Hereinafter, the embodiments of the present invention will be described referring to the drawings. The first embodiment described below, corresponding to an application of the present invention to a film scanner, exemplifies the rewrite operation of a program stored in the flash memory of a film scanner. A program stored in the flash memory is executed by the CPU of a film scanner to control the operation of individual portions of the film scanner.

FIG. 1 is a block diagram showing one example of an image reading system composed of a film scanner 20 and a PC 30. As shown in FIG. 1, the film scanner 20 is connected to the PC 30 through an SCSI interface 2. The PC 30 comprises a monitor 31 and a console unit 32. The monitor 31, serving as the display in response to an instruction of the PC 30, comprises a CRT or an LCD. The console unit 32 is an input tool such as a keyboard or a mouse.

The CPU 1 of the film scanner 20 receives an instruction from the PC 30 through the SCSI interface 2 to control the individual portions of the film scanner 20. The CPU 1 performs processes in accordance with a program stored in the flash memory 3. RAM 4 is a memory for temporarily storing data when the CPU 1 performs processes.

The LED driving circuit 5 drives an LED light source 11 under the control of the CPU 1. The LED light source 11 illuminates a film original 17. As shown in FIG. 1, rays of light emitted from the LED light source 11 are collected by a lens 12 and arrive at a CCD 13. On the image surface of the CCD 13, the image of the film original 17 is focused. The CCD 13 converts the image on the film original 17 into an electric image signal. Here, the CCD driving circuit 6 is a circuit for driving the CCD 13 under control of the CPU 1.

The film original 17 can be passed out from and wound into the cartridge 15. That is, an original driving motor driving circuit 9 drives an original drive motor 16 under the control of the CPU 1. Here, controlling the rotational direction or the rotational speed of the original drive motor 16 by the CPU 1 enables the passing-out or winding of the film original 17. The position of the film original 17 is detected by the CPU 1 in accordance with a signal outputted from an original position sensor 14.

The CCD 13 converts the image on the film original 17 into an electric image signal. The image signal outputted from the CCD 13 is inputted to a signal processing circuit 7. Under the control of the CPU 1, the signal processing circuit 7 subjects the inputted image signal to various signal processing for output to an A/D convertor 8. Under the control of the CPU 1, the A/D convertor 8 converts the inputted image signal into a digital signal.

The image signal outputted from the A/D convertor 8 is stored in the RAM 4. The image signal stored in the RAM 4 is outputted to the PC 30 through the SCSI interface 2. The PC 30 receives and displays the image signal on the monitor 31.

Figure 2:
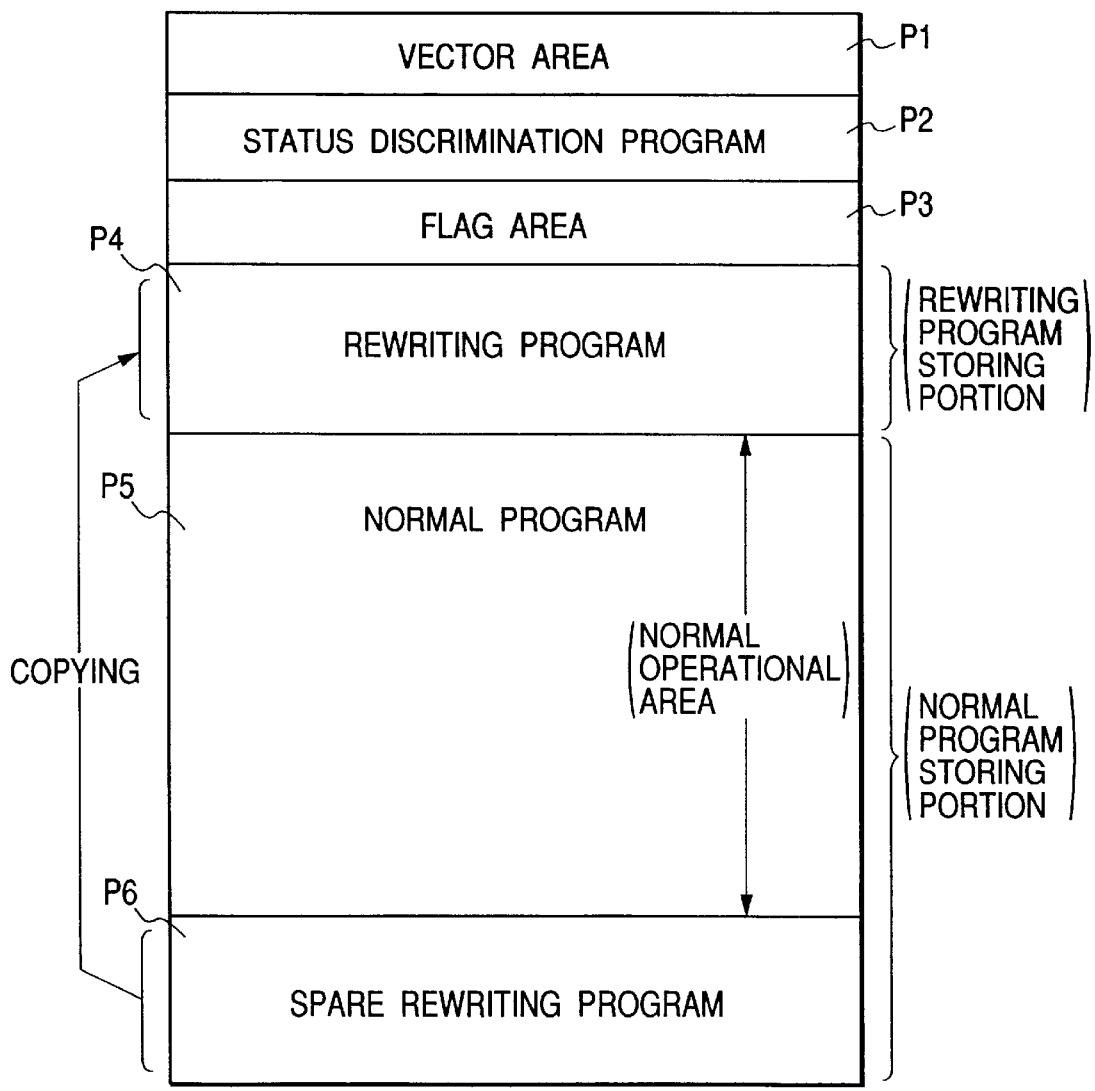
FIG. 2 is an illustration of the stored content of a flash memory according to a first embodiment.

FIG. 2 is an illustration of the stored content of the flash memory 3 shown in FIG. 1. As shown in FIG. 2, the flash memory 3 comprises six program areas P1 to P6.

A vector area P1 stores the head addresses and tail addresses of individual program areas (P1, P2 to P6).

A status discrimination program P2 discriminates the status of progress in the rewrite of a program by referring to a flag area P3.

The flag area P3 is equipped with a plurality of flags indicating the status of progress in the rewrite of a program. To be specific, the flag area P3 stores a flag indicating the update record of the normal program mentioned in Summary of the Invention (in the embodiment described below, referred to as normal program update flag) and stores a flag indicating the update record of the rewriting program mentioned in Summary of the Invention (in the embodiment described below, referred to as rewriting program update flag).

The rewriting program P4 includes a simplified communication program for rewrite operation used for the simplified communication with a PC and a flash memory rewrite operation control program.

The normal program P5 comprises a communication function with a PC and a control function for controlling individual portions in the film scanner 20.

The spare rewriting program P6 comprises a simplified communication program for rewrite operation used in simplified communication with a PC and a flash memory rewrite operation control program.

Figure 3:
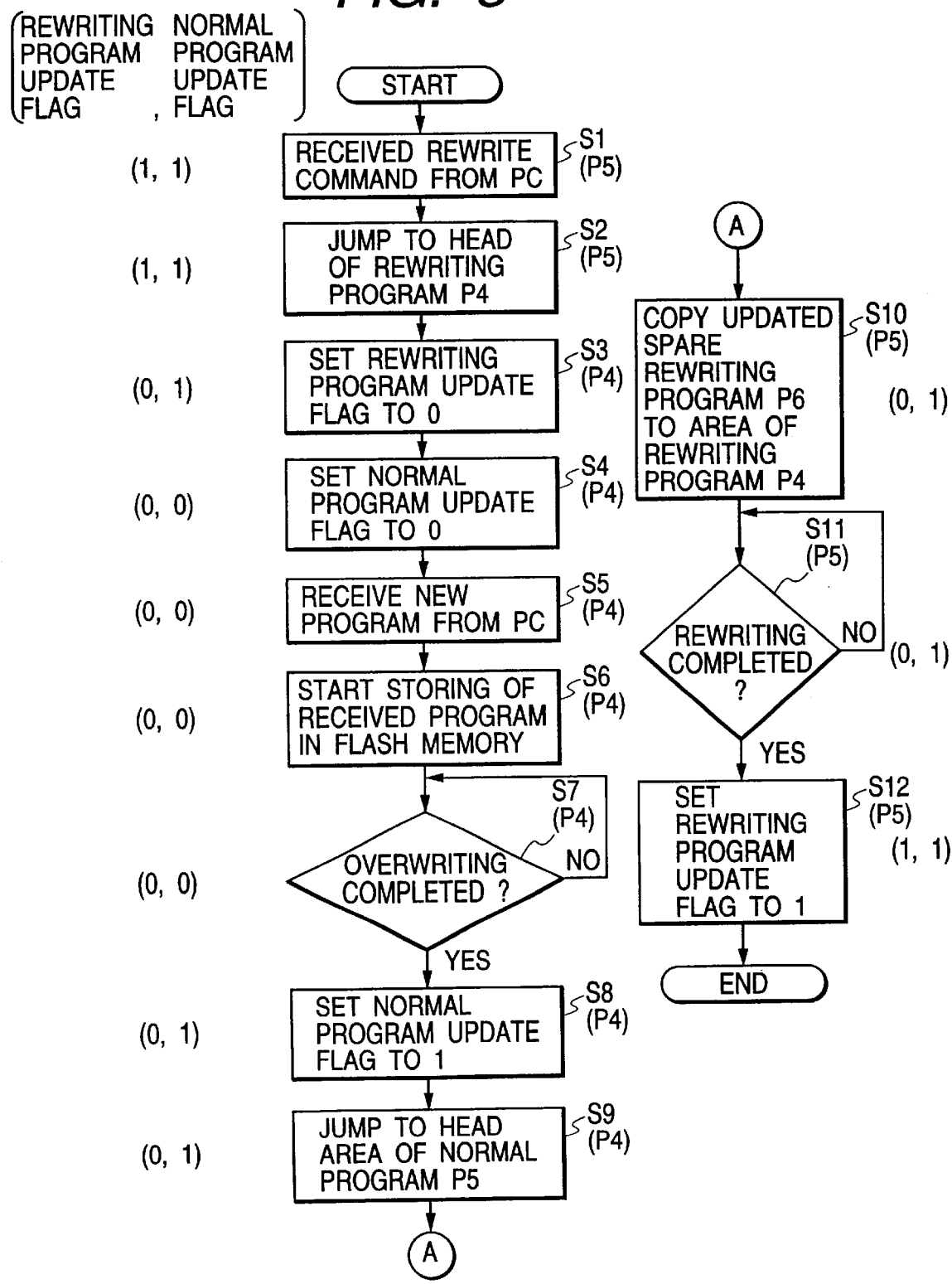
FIG. 3 is a flowchart showing the rewrite procedure of a flash memory according to the first embodiment.

FIG. 3 is a flowchart showing the rewrite procedure of a flash memory 3. Incidentally, the flowchart shown in FIG. 3 represents the flow of processes which the CPU 1 executes in accordance with programs stored in the flash memory 3. Individual steps S1 to S12 shown in FIG. 3 are executed in accordance with the rewriting program P4 or the normal program P5 shown in FIG. 2. To be specific, the steps S1, S2, S10, S11 and S12 are executed in accordance with the normal program P5 shown in FIG. 2. Besides, the steps S3 to S9 are executed in accordance with the rewriting program P4 shown in FIG. 2. Hereinafter, the flowchart shown in FIG. 3 will be described.

Figure 4:
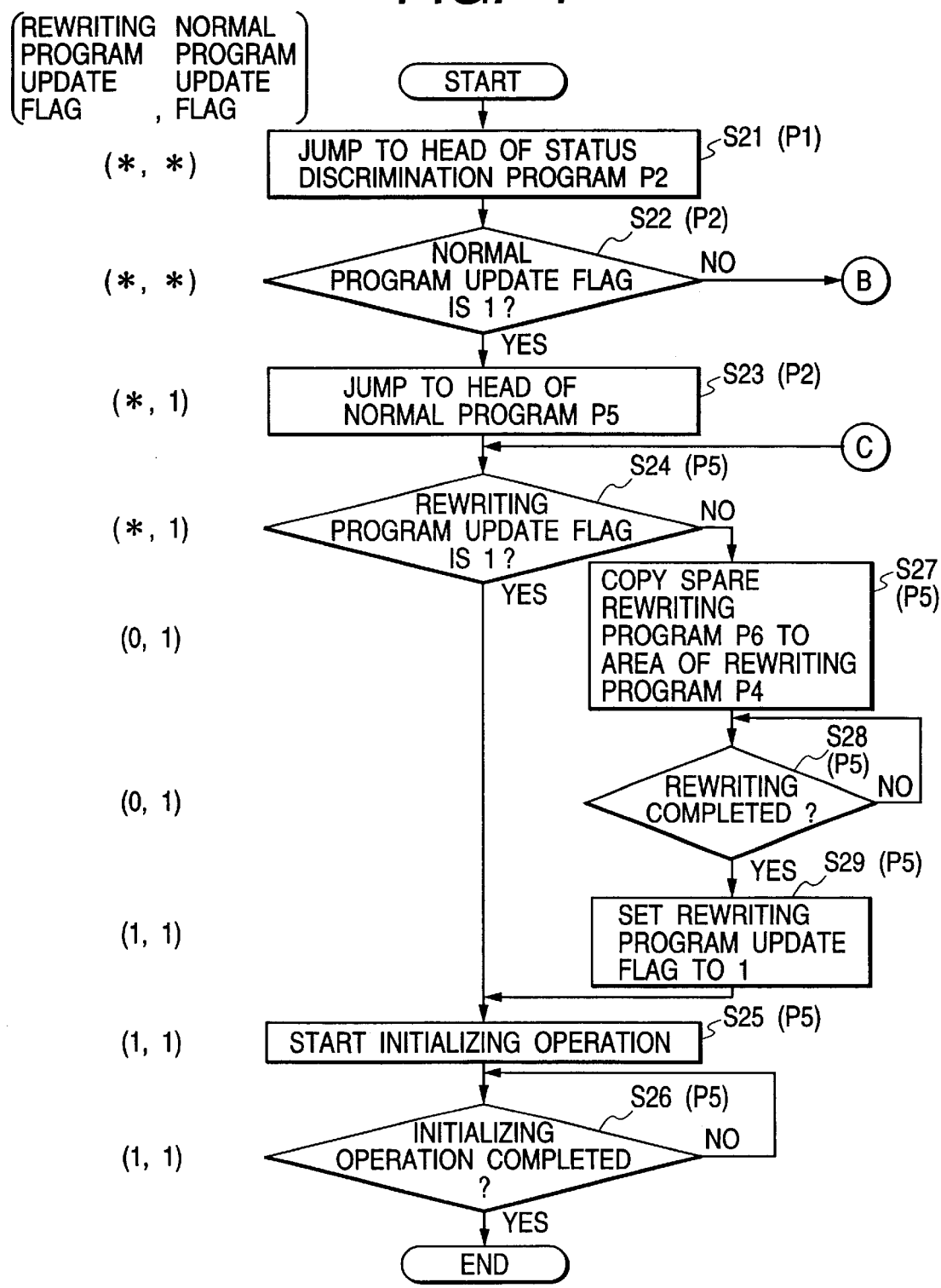
FIG. 4 is a flowchart showing the operation at the initialization of a film scanner shown in FIG. 1 according to the first embodiment.
Figure 5:
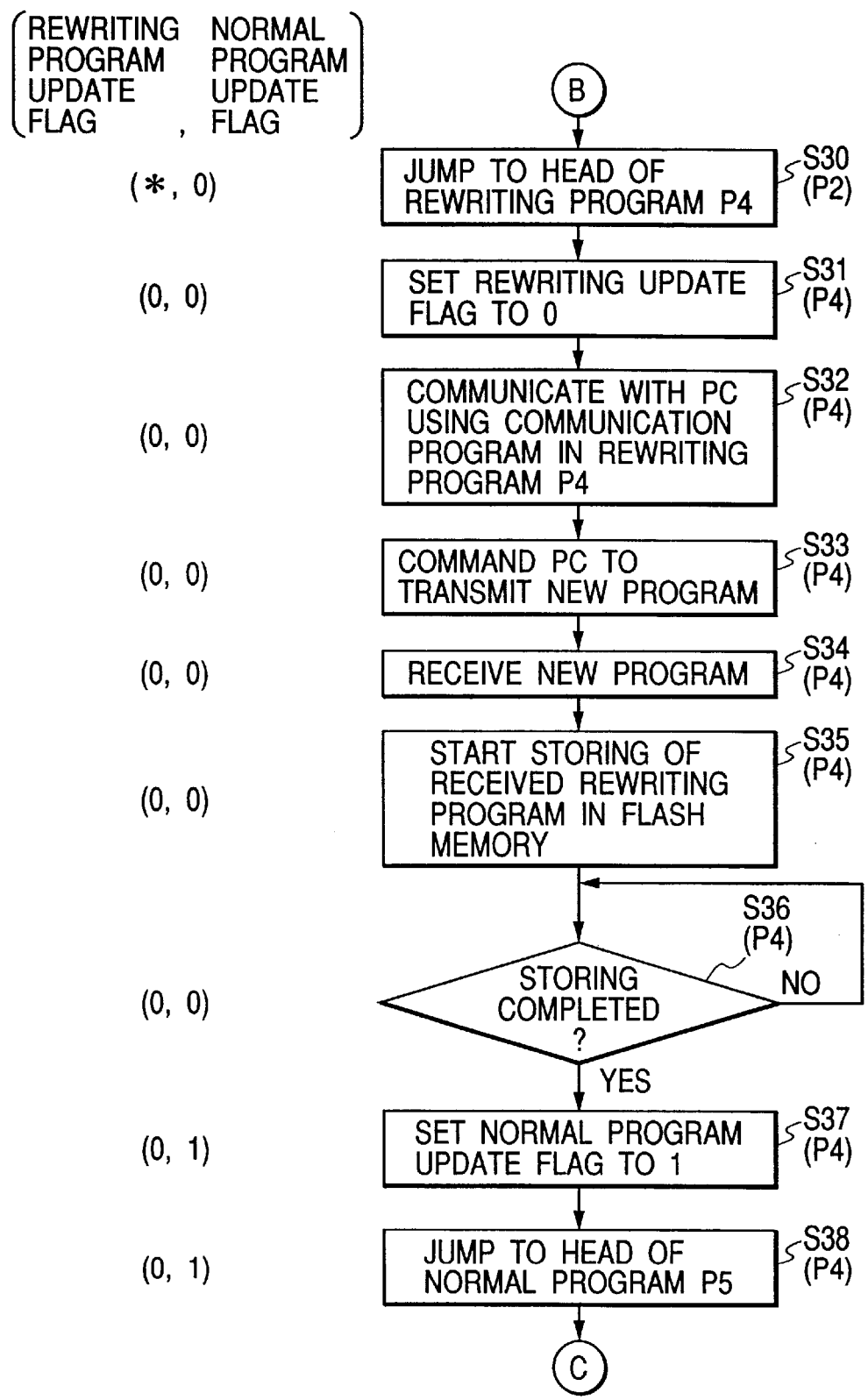
FIG. 5 is a flowchart showing the operation at the initialization of a film scanner shown in FIG. 1 according to the first embodiment.

Incidentally, in FIG. 3 and subsequent FIGS. 4 and 5, the status of rewriting program update flag and normal program update flag is represented in the parentheses beside the flowchart. The mark * in the display of a flag status indicates that it has not been discriminated whether the relevant flag is 1 or 0.

At the step S1, on the basis of the communication function of the normal program P5 stored in the flash memory 3, the CPU 1 performs the process of receiving a program rewrite command from the PC 30.

At the step S2, on the basis of the control function of the normal program P5 stored in the flash memory 3, the CPU 1 makes the readout address of the flash memory 3 to jump to the head address of the rewriting program P4 stored in the flash memory 3.

At the step S3, referring to the flash memory rewrite operation control program included in the rewriting program P4 stored in the flash memory 3, the CPU 1 sets the rewriting program update flag stored in the flag area P3 to 0.

Incidentally, the rewriting program update flag is a flag for indicating whether or not the rewriting program P4 shown in FIG. 3 has been rewritten. A rewriting program update flag of 1 signifies that the spare rewriting program P6 has been overwritten over the rewriting program P4, while a rewriting program update flag of 0 signifies that the above overwrite is in progress, has not been executed or ends in failure for some cause.

At the step S4, referring to the flash memory rewrite operation control program included in the rewriting program P4 stored in the flash memory 3, the CPU 1 sets the normal program update flag stored in the flag area P3 to 0.

Incidentally, the normal program update flag is a flag for indicating whether or not the normal program P5 and the spare rewriting program P6 shown in FIG. 3 have been overwritten in accordance with the update program received from a PC 30. A normal program update flag of 1 signifies that the overwrite is completed, while a rewriting program update flag of 0 signifies that the overwrite is in progress, has not been executed or ends in failure for some cause.

Next, at the step S5, referring to the simplified communication program for rewrite operation included in the rewriting program P4 stored in the flash memory 3, the CPU 1 starts the reception of the update program via the SCSI interface 2 from the PC 30. The received update program is to be used for updating the normal program P5 and the spare rewriting program P6 shown in FIG. 2.

At the step S6, referring to the flash memory rewrite operation control program included in the rewriting program P4 stored in the flash memory 3, the CPU 1 stores the received update program into the flash memory 3. The program is stored in the normal program storing portion in which the normal program P5 and the spare rewriting program P6 are stored (see FIG. 2).

At the step S7, referring to the flash memory rewrite operation control program included in the rewriting program P4 stored in the flash memory 3, the CPU 1 discriminates whether or not the writing in the step 6 is completed. The CPU 1 retains the above discrimination status till the writing is completed. On discriminating that writing is completed, the CPU 1 forwards the process to the step S8.

At the step S8, referring to the flash memory rewrite operation control program of the rewriting program P4 stored in the flash memory 3, the CPU 1 sets the normal program update flag stored in the flag area P3 to 1.

At the step S9, referring to the flash memory rewrite operation control program included in the rewriting program P4 stored in the flash memory 3, the CPU 1 causes the readout address of the flash memory 3 to jump to the head address of the normal program P5.

At the step S10, referring to the overwritten (or update) normal program P5, the CPU 1 copies (overwrites) the overwritten (or update) spare rewriting program P6 to the rewriting program P4.

At the step S11, referring to overwritten normal program P5, the CPU 1 discriminates whether or not the overwrite in the step S10 is completed. The CPU 1 retains the above discrimination status till the overwrite is completed. On discriminating that overwrite is completed, the CPU 1 forwards the process to the step S12.

At the step S12, referring to the overwritten normal program P5, the CPU 1 sets the rewriting program update flag to 1.

FIGS. 4 and 5 are flowcharts showing the operation at the initialization (at a time such as turning on power supply) of the film scanner 20 shown in FIG. 1. The flowcharts shown in FIGS. 4 and 5 are executed by the CPU 1 in accordance with programs stored in the flash memory 3. To be specific, the step S21 is executed in accordance with the program inside the vector area P1 shown in FIG. 2. The steps S22, S23 and S30 are executed in accordance with the program of the flag area P2 shown in FIG. 2. Furthermore, the steps S24 to S29 are executed in accordance with the normal program P5 shown in FIG. 2. Still further, the steps S31 to S38 are executed in accordance with the rewriting program P4 shown in FIG. 2. Hereinafter, referring to the flowcharts shown in FIGS. 4 and 5, the operation of the initialization time will be described.

With the initialization at a time such as turning on power of the film scanner 20, the flowcharts of FIGS. 4 and 5 start.

At the step S21, referring to the program of the vector area P1 shown in FIG. 2, the CPU 1 jumps to the head of the status discrimination program P2.

At the step S22, referring to the status discrimination program P2, the CPU 1 discriminates whether or not the normal program update flag is 1. Here, if the normal program update flag is 1, it means that the overwrite of the normal program P5 and the spare rewriting program P6 have been normally terminated in the previous program rewrite operation. If the normal program update flag is not 1, it means that the overwrite of the normal program P5 and the spare rewriting program P6 have not been normally terminated in the previous program rewrite operation. If the normal program update flag is discriminated to be 1, the CPU 1 forwards the process to the step S23. If the normal program update flag is discriminated not to be 1, the CPU 1 forwards the process to the step S30 (see FIG. 5). Here, on the assumption that the normal program update flag is 1 and the process proceeds to the step S23, the description will be continued.

At the step S23, referring to the status discrimination program P2, the CPU 1 causes the readout address of the flash memory 3 to jump the head address of the normal program P5.

At the step S24, on the basis of the control function of the normal program P5, the CPU 1 discriminates whether or not the rewriting program update flag is 1. Here, if the rewriting program update flag is discriminated to be 1, it means that the spare rewriting program P6 has been normally copied to the rewriting program P4 in the previous rewrite operation. If the rewriting program update flag is discriminated not to be 1, it means that the spare rewriting program P6 has not been normally copied to the rewriting program P4 in the previous rewrite operation. In other words, if the rewriting program update flag is not 1, the copy ends in failure for some cause. The CPU 1 forwards the process to the step S27 if the rewriting program update flag is not 1.

At the step S27, on the basis of the control function of the normal program P5, the CPU 1 copies (overwrites) the spare rewriting program P6 to the rewriting program P4.

At the step S28, on the basis of the control function of the normal program P5, the CPU 1 discriminates whether or not the writing at the step S28 is completed. The CPU 1 retains the above discrimination status till the writing is completed. If the writing is discriminated to be completed, the CPU 1 forwards the process to the step S29.

At the above step S24, if the rewriting program update flag is discriminated to be 1, the CPU 1 forwards the process to the step S25 without performing the processes of the steps S27 to S29.

At the step S29, on the basis of the control function of the normal program P5, the CPU 1 sets the rewriting program update flag to 1. Thereafter, the CPU 1 forwards the process to the step S25 on the basis of the control function of the normal program P5.

At the step S25, on the basis of the control function of the normal program P5, the CPU 1 executes the initializing operation in the mechanistic system and the electric circuit system of the film scanner 20.

At the step S26, on the basis of the control function of the normal program P5, the CPU 1 discriminates whether or not the initializing operation at the step S25 is completed. The CPU 1 retains the above discrimination status till the initializing operation is completed. On discriminating that the initializing operation is completed, the CPU 1 terminates the process.

As mentioned above, at the step S22, if the normal program update flag is discriminated not to be 1, the CPU 1 forwards the process to the step S30 (see FIG. 5).

At the step S30, referring to the status discrimination program P2, the CPU 1 causes the readout address of the flash memory 3 to jump to the head address of the rewriting program P4.

At the step S31, referring to the flash memory rewrite operation control program included in the rewriting program P4 stored in the flash memory 3, the CPU 1 sets the rewriting program update flag stored in the flag area P3 to 0.

Next, at the step S32, referring to the simplified communication program for rewrite operation inside the rewriting program P4 stored in the flash memory 3, the CPU 1 starts the communication with the PC 30.

At the step S33, referring to the simplified communication program for rewrite operation included in the rewriting program P4, the CPU 1 commands the PC 30 to transmit the update program.

At the step S34, referring to the simplified communication program for rewrite operation included in the rewriting program P4, the CPU 1 starts the reception of the update program from the PC 30 via the SCSI interface 2. The received update program is to be used for updating the normal program P5 and the spare rewriting program P6 shown in FIG. 2.

At the step S35, referring to the flash memory rewrite operation control program included in the rewriting program P4, the CPU 1 stores the received update program into the flash memory 3. The storing area is the normal program storing portion storing the normal program P5 and the spare rewriting program P6 (see FIG. 2).

At the step S36, referring to the flash memory rewrite operation control program included in the rewriting program P4 stored in the flash memory 3, the CPU 1 discriminates whether or not the write at the step S35 is completed. The CPU 1 retains the above discrimination status till the write is completed. If the write is discriminated to be completed, the CPU 1 forwards the process to the step S37.

At the step S37, referring to the flash memory rewrite operation control program included in the rewriting program P4, the CPU 1 sets the normal program update flag stored in the flag area P3 to 1.

At the step S38, referring to the flash memory rewrite operation control program included in the rewriting program P4, the CPU 1 causes the readout address of the flash memory 3 to jump to the head address of the normal program P5. Then, referring to the flash memory rewrite operation control program, the CPU 1 forwards the process to the step S24. The subsequent processing is as mentioned above.

In the embodiment mentioned above, a description was made by taking the flash memory as an example. However, the present invention is not limited to this and applicable to any electrically erasable, writable and overwritable memory.

Besides, in the embodiment mentioned above, a description was made by taking the system of a film scanner and a PC as an example. However, the present invention is not limited to this and applicable to any system that receives a program from an external device. Furthermore, parameters for the control of individual portions are also contained in the normal program. By an apparatus according to this embodiment, parameters alone may be so arranged as to be rewritable.

As evident from the above description, this embodiment enables the rewrite to be again executed in case of failure in rewriting a program stored in the flash memory.

Besides, since this embodiment permits both the rewriting program storing portion (storing area of P4) and the normal program storing portion (storing areas of P5 and P6) to be rewritten, the addition of a function in the communication function and the amendment of a fault are executable.

Subsequently, a second embodiment of the present invention will be described. As with the first embodiment, in this second embodiment of the invention is also applied to a scanner. The configuration of a film scanner and its connection to a PC are the same as shown in FIG. 1.

Figure 6:
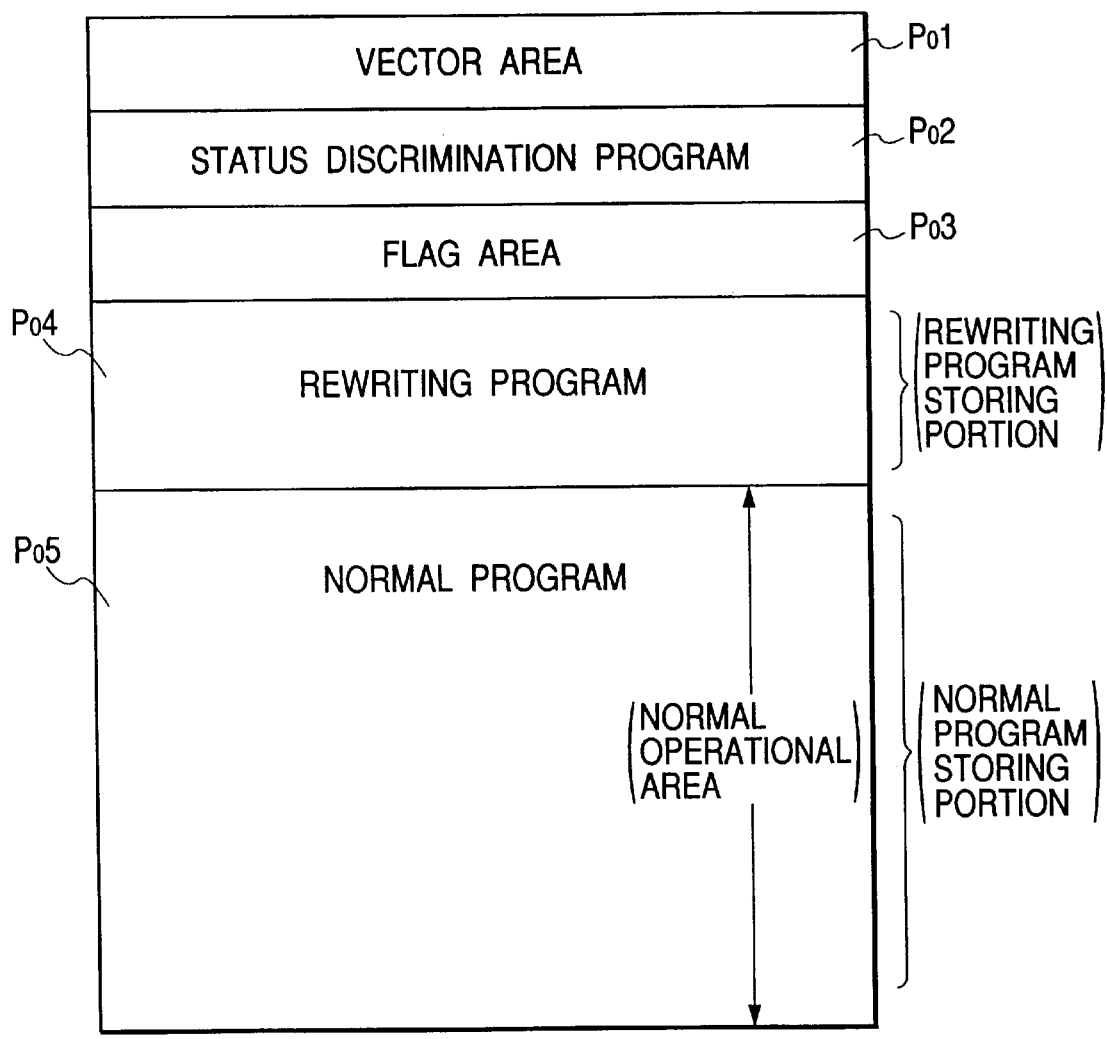
FIG. 6 is an illustration of the stored content of a flash memory according to a second embodiment.

FIG. 6 is an illustration of the stored content of the flash memory 3 shown in FIG. 1 according to the second embodiment. As shown in FIG. 6, the flash memory 3 comprises five program areas ($P_0 1$ to $P_0 5$).

The vector area $P_0 1$ stores the head, tail and such other addresses of individual program areas ($P_0 1$, $P_0 2$ to $P_0 5$).

The status discrimination program $P_0 2$ discriminates the progress status of rewriting a program by referring to the flag area $P_0 3$.

The flag area $P_0 3$ is equipped with a plurality of flags indicating the progress status of rewriting a program. To be specific, the flag area $P_0 3$ stores a flag (referred to as normal program update flag) indicative of the normal program update record mentioned in Summary of the Invention and a flag (referred to as rewriting program update flag) indicative of the rewriting program update record mentioned in Summary of the Invention.

The rewriting program $P_0 4$ incldes a simplified communication program for rewrite operation used in simplified communication with the PC 30 and a flash memory rewrite operation control program.

The normal program $P_0 5$ includes a communication program with the PC 30, a flash memory rewrite operation control program and a control program for controlling individual portions of the film scanner 20.

Figure 7:
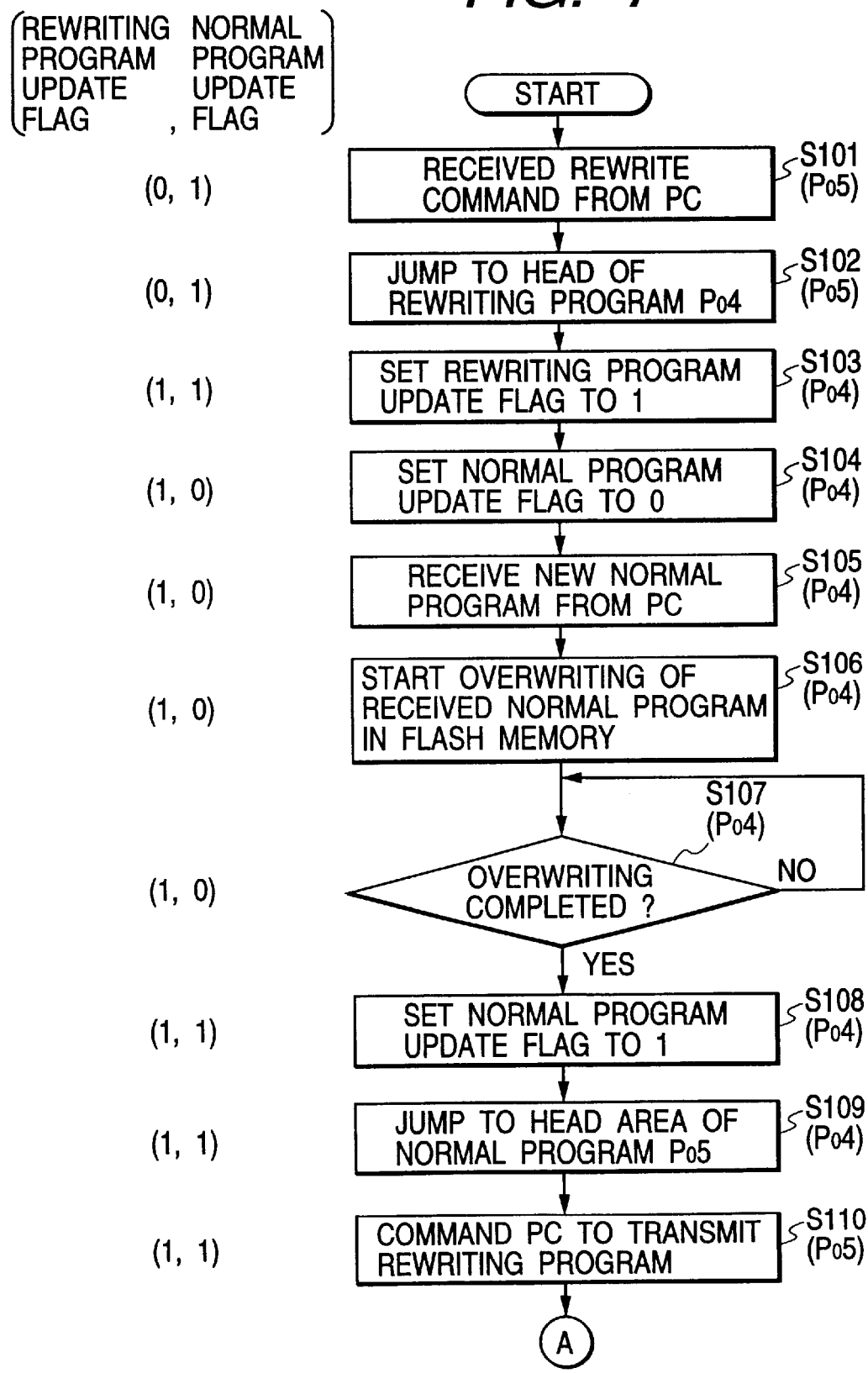
FIG. 7 is a flowchart showing the rewrite procedure of a flash memory according to the second embodiment.
Figure 8:
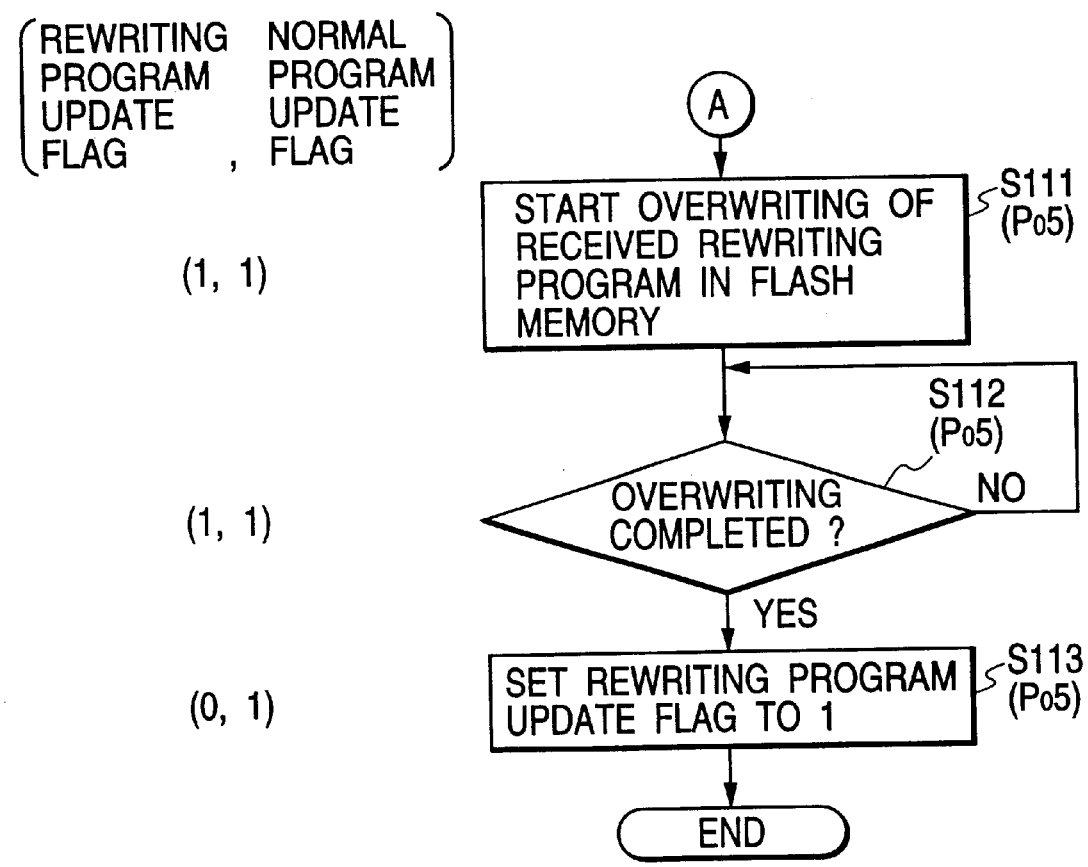
FIG. 8 is a flowchart showing the rewrite procedure of a flash memory according to the second embodiment.

FIGS. 7 and 8 are flowcharts showing the rewrite procedure of a flash memory 3. Incidentally, the flowcharts shown in FIGS. 7 and 8 represent the execution of the CPU 1 in accordance with programs stored in the flash memory 3. And, individual steps S101 to S113 shown in FIG. 7 are executed in accordance with the rewriting program $P_0 4$ and the normal program $P_0 5$ shown in FIG. 6. To be specific, the steps S101, S102, S110, S111, S112 and S113 are executed in accordance with the normal program $P_0 5$ shown in FIG. 6, while the steps S103 to S109 are executed in accordance with the rewriting program $P_0 4$ shown in FIG. 6.

Furthermore, FIGS. 7 and 8 show the status of successive change in the rewriting and normal program update flags at each of the steps. The rewriting and normal program update flags are stored in the flag area $P_0 3$ shown in FIG. 6. Hereinafter, the flowcharts shown in FIGS. 7 and 8 will be described.

At the step S101, on the basis of the communication function of the normal program $P_0 5$ stored in the flash memory 3, the CPU 1 receives a program rewrite command sent from the PC 30.

At the step S102, referring to the control program of the normal program $P_0 5$ stored in the flash memory 3, the CPU 1 causes the readout address of the flash memory 3 to jump to the head address of the rewriting program $P_0 4$.

At the step S103, referring to the flash memory rewrite operation control program included in the rewriting program $P_0 4$ stored in the flash memory 3, the CPU 1 sets the rewriting program update flag stored in the flag area $P_0 3$ to 1.

Incidentally, the rewriting program update flag is a flag indicative of whether both the rewriting program $P_0 4$ and the normal program $P_0 5$ shown in FIG. 6 have been rewritten. A rewriting program update flag of 0 signifies that both the rewriting program $P_0 4$ and the normal program $P_0 5$ have been overwritten. A rewriting program update flag of 1 signifies that the above overwrite is under execution or ends in failure for some cause.

At the step S104, referring to the flash memory rewrite operation control program included in the rewriting program $P_0 4$ stored in the flash memory 3, the CPU 1 sets the normal program update flag stored in the flag area $P_0 3$ to 0.

Incidentally, the normal program update flag is a flag indicative of whether or not the normal program $P_0 5$ shown in FIG. 6 has been overwritten by the update program received from the PC 30. A normal program update flag of 1 signifies that the overwrite has been terminated, while a normal program update flag of 0 signifies that the above overwrite is being executed or ended in failure for some cause.

Next, at the step S105, referring to the simplified communication program for rewrite operation included in the rewriting program $P_0 4$ stored in the flash memory 3, the CPU 1 starts the receiving of a new normal program from the PC 30 via the SCSI interface 2. The received new normal program is to be used for updating the normal program $P_0 5$ shown in FIG. 6.

At the step S106, referring to the flash memory rewrite operation control program included in the rewriting program $P_0 4$ stored in the flash memory 3, the CPU 1 overwrites the received normal program over the normal program storing portion (see FIG. 6) of the flash memory 3.

At the step S107, referring to the flash memory rewrite operation control program included in the rewriting program $P_0 4$ stored in the flash memory 3, the CPU 1 discriminates whether or not the overwrite at the step S106 is terminated. The CPU 1 retains the above discrimination status till the overwrite is terminated. If the overwrite is discriminated to be terminated, the CPU 1 forwards the process to the step S108.

At the step S108, referring to the flash memory rewrite operation control program included in the rewriting program $P_0 4$ stored in the flash memory 3, the CPU 1 sets the normal program update flag stored in the flag area $P_0 3$ to 1.

At the step S109, referring to the flash memory rewrite operation control program included in the rewriting program $P_04$ stored in the flash memory 3, the CPU 1 causes the readout address of the flash memory 3 to jump to the head address of the normal program $P_05$. Thereby, the control of the film scanner 20 as well as the communication with the PC 30 shifts from the rewriting program $P_04$ to the updated normal program $P_05$.

At the step S110, referring to the communication program included in the overwritten normal program $P_05$ stored in the flash memory 3, the CPU 1 commands the PC 30 to send the rewriting program for update to the film scanner 20.

At the step S111, referring to the flash memory rewrite operation control program included in the overwritten normal program $P_05$ stored in the flash memory 3, the CPU 1 overwrites the received rewriting program for update over the rewriting program storing portion (see FIG. 6) of the flash memory 3.

At the step S112, referring to the flash memory rewrite operation control program included in the overwritten normal program $P_05$ stored in the flash memory 3, the CPU 1 discriminates whether or not the overwrite at the step S111 is terminated. The CPU 1 retains the above discrimination status till the overwrite is terminated. If the overwrite is discriminated to be terminated, the CPU 1 forwards the process to the step S113.

At the step S113, referring to the flash memory rewrite operation control program included in the overwritten normal program $P_05$ stored in the flash memory 3, the CPU 1 sets the rewriting program update flag stored in the flag area $P_03$ to 0.

As evident from FIGS. 7 and 8, a success in the update of the flash memory 3 corresponds to the status of (0, 1) in terms of (rewriting program update flag, normal program update flag). Thus, the status of (1, 1) and (1, 0) in terms of (rewriting program update flag, normal program update flag) signifies the abnormal completion of the update of a program. Incidentally, as evident from FIGS. 7 and 8, (rewriting program update flag, normal program update flag) is not set to (0, 0) by any means.

Figure 9:
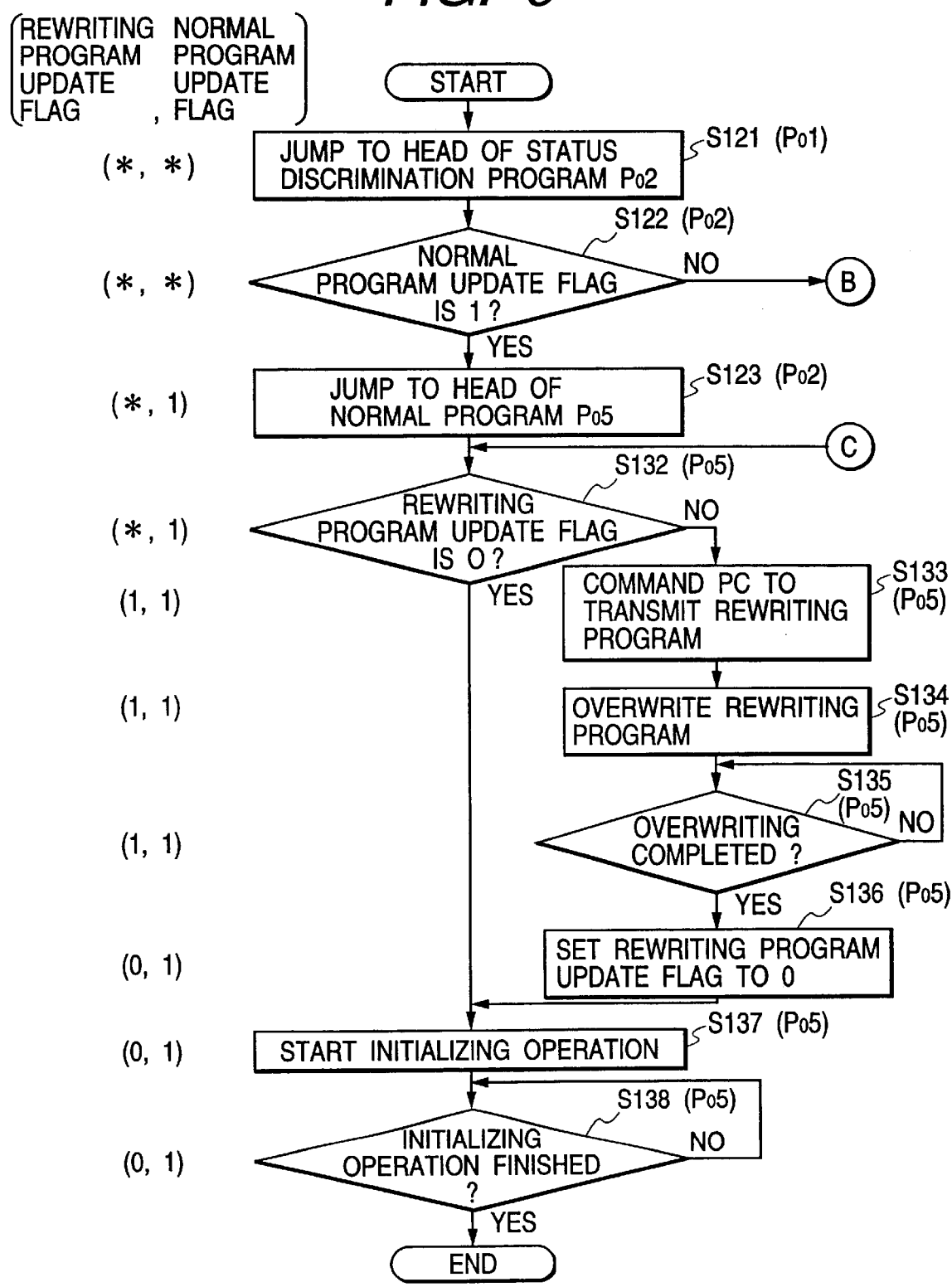
FIG. 9 is a flowchart showing the operation at the initialization of a film scanner shown in FIG. 1 according to the second embodiment.

FIGS. 9 and 10 are flowcharts showing the operation at the initialization (at a time such as turning on power) of the film scanner 20 shown in FIG. 1. The flowcharts shown in FIGS. 9 and 10 represent the execution of the CPU 1 in accordance with programs stored in the flash memory 3. To be specific, the step S121 is executed in accordance with the program of the vector area $P_01$ shown in FIG. 6. And, the steps S122, S123 and S124 are executed in accordance with the status discrimination program $P_02$ shown in FIG. 6, while the steps S125 to S131 are executed in accordance with the rewriting program $P_04$ shown in FIG. 6. Besides, the steps S132 to S138 are executed in accordance with the normal program $P_05$ shown in FIG. 6.

Furthermore, FIGS. 9 and 10 show the status of successive change in the rewriting and normal program update flags at each of the steps. The rewriting and normal program update flags are stored in the flag area $P_03$ shown in FIG. 6. Incidentally, the mark * in FIGS. 9 and 10 indicates the status that it has not been discriminated whether the relevant flag is 1 or 0.

Hereinafter, referring to the flowcharts shown in FIGS. 9 and 10, the operation at the initialization will be described. The flowcharts shown in FIGS. 9 and 10 start with the initialization of the film scanner 20 originating in turning on the power.

At the step S121, referring to the program of the vector area $P_01$ shown in FIG. 6, the CPU 1 causes the readout address of the flash memory 3 to jump to the head address of the status discrimination program $P_02$.

At the step S122, referring to the status discrimination program $P_02$, the CPU 1 discriminates whether or not the normal program update flag is 1. Here, if the normal program update flag is 1, it means that the overwrite of the normal program $P_05$ has been normally terminated in the previous rewrite operation of a program. If not, the overwrite of the normal program $P_05$ has not been normally terminated in the previous rewrite operation of the program. On discriminating that the normal program update flag is 1 (normal termination), the CPU 1 forwards the process to the step S123. On discriminating that the normal program update flag is not 1, the CPU 1 forwards the process to the step S124 (see FIG. 10). Here, on the assumption that the normal program update flag is 1 and the process proceeds to the step S123, a description will be continued.

At the step S123, referring to the status discrimination program $P_02$, the CPU 1 causes the readout address of the flash memory 3 to jump to the head address of the normal program $P_05$.

At the step S132, referring to the control program of the normal program $P_05$, the CPU 1 discriminates whether or not the rewriting program update flag is 0. Here, if the rewriting program update flag is discriminated to be 0, it means that the rewriting program $P_04$ has been normally overwritten in the previous rewrite operation of the program. If the rewriting program update flag is discriminated not to be 0, the rewriting program $P_04$ has not been normally overwritten in the previous rewrite operation of the program. Namely, the overwrite ended in failure for some cause. If the rewriting program update flag is not 0, the CPU 1 forwards the process to the step S133.

At the step S133, referring to the communication program included in the normal program $P_05$ stored in the flash memory 3, the CPU 1 commands the PC 30 to send the rewriting program for update to the film scanner 20.

At the step S134, referring to the flash memory rewrite operation control program included in the normal program $P_05$ stored in the flash memory 3, the CPU 1 overwrites the received rewriting program for update over the rewriting program storing portion (see FIG. 6) of the flash memory 3.

At the step S135, referring to the flash memory rewrite operation control program included in the normal program $P_05$ stored in the flash memory 3, the CPU 1 discriminates whether or not the overwrite at the step S134 is terminated. The CPU 1 retains the above discrimination status till the overwrite is terminated. On discriminating that the overwrite is terminated, the CPU 1 forwards the process to the step S136.

At the step S136, referring to the flash memory rewrite operation control program included in the normal program $P_05$ stored in the flash memory 3, the CPU 1 sets the rewriting program update flag stored in the flag area $P_03$ to 0. Thereafter, referring to the control program of the normal program $P_05$, the CPU 1 forwards the process to the step S137.

At the step S132 mentioned above, if the rewriting program update flag is discriminated to be 0, the CPU 1 forwards the process to the step S137 without performing the processes of the steps S133 to S136.

At the step S137, referring to the control program of the normal program $P_05$, the CPU 1 executes the initializing operation of the mechanistic system and the electric circuit system of the film scanner 20.

At the step S138, referring to the control program of the normal program $P_05$, the CPU 1 discriminates whether or not the initializing operation at the step S137 is terminated. The CPU 1 retains the above discrimination status till the initializing operation is terminated. On discriminating that the initializing operation is terminated, the CPU 1 terminates the process.

As mentioned above, on discriminating that the normal program update flag is not 1 at the step S122, the CPU 1 forwards the process to the step S124 (see FIG. 10).

At the step S124, referring to the status discrimination program $P_O2$, the CPU 1 causes the readout address of the flash memory 3 to jump to the head address of the rewriting program $P_O4$.

At the step S125, referring to the flash memory rewrite operation control program included in the rewriting program $P_O4$ stored in the flash memory 3, the CPU 1 sets the rewriting program update flag stored in the flag area $P_O3$ to 1.

At the step S127, based on the simplified communication program for rewrite operation inside the rewriting program $P_O4$, the CPU 1 commands the PC 30 to send the normal program for update. Subsequently, referring to the simplified communication program for rewrite operation inside the rewriting program $P_O4$, the CPU 1 starts the receiving of the normal program for update from the PC 30 via the SCSI interface 2. The received normal program is to be used for updating the normal program $P_O5$ shown in FIG. 6.

At the step S128, referring to the flash memory rewrite operation control program included in the rewriting program $P_O4$, the CPU 1 overwrites the received normal program for update over the normal program storing portion (see FIG. 6) of the flash memory 3.

At the step S129, referring to the flash memory rewrite operation control program included in the rewriting program $P_O4$ stored in the flash memory 3, the CPU 1 discriminates whether or not the overwrite at the step S128 is terminated. The CPU 1 retains the above discrimination status till the overwrite is terminated. On discriminating that the overwrite is terminated, the CPU 1 forwards the process to the step S130.

At the step S130, referring to the flash memory rewrite operation control program included in the rewriting program $P_O4$, the CPU 1 sets the normal program update flag stored in the flag area $P_O3$ to 1.

At the step S131, referring to the flash memory rewrite operation control program included in the rewriting program $P_O4$, the CPU 1 causes the readout address of the flash memory 3 to jump to the head address of the overwritten normal program $P_O5$. Next, referring to the above flash memory rewrite operation control program, the CPU 1 forwards the process to the step S132. The subsequent procedure is as mentioned above.

In the embodiment mentioned above, a description was made by taking the flash memory as an example. However, the present invention is not limited to this and applicable to any electrically erasable, writable and overwritable memory.

In the embodiment mentioned above, the order of performing the overwrite of a normal program in a first period and a rewriting program in a second period may be exchanged.

In the embodiment mentioned above, a description was made by taking the system of a film scanner and a PC as an example. However, the present invention is not limited to this and applicable to any system that receives a program from an external device.

As clear from the above description, according to this embodiment, two programs having the rewrite function are stored in different areas of the flash memory and two flags are used to detect the rewrite status of a program. Thus, according to this embodiment, the failure in rewriting a program stored in the flash memory can be easily detected. In addition, in case of failure in rewriting a program, a user is enabled to execute the rewrite again.

According to this embodiment, the rewriting program storing portion (storing area for $P_O4$) and the normal program storing portion (storing area for $P_O5$) can respectively be rewritten at different timing. Thus, according to this embodiment, adding a function or amending a fault can be performed from the PC side.

Incidentally, in the first and second embodiments mentioned above, the normal program and the rewriting program were so arranged as to be received from the PC 30, but the following manner of reception is also allowable.

The film scanner 20 has a memory card slot. The memory card slot, capable of inserting a memory card of external device, is connected to the CPU 1 via a CPU bus. Namely, this corresponds to the replacement of the PC 30 and the SCSI interface 2 shown in FIG. 1 with a memory card slot. Examples of memory cards may include compact flash and smart media.

When wanting to update the normal program, a user first writes the normal program and the rewriting program into a memory card. Then, a user mounts the memory card to the memory card slot. In this status, the CPU 1 has just only to execute the program of FIG. 3 (first embodiment) or that of FIGS. 7 and 8 (second embodiment). Thereby, the CPU 1 reads the normal program or the rewriting program from the memory card for reception. And, the rewrite of the normal program and the rewriting program in the flash memory 3 is implemented.

If the overwrite of the normal program and the rewriting program should end in failure, it is only necessary to make the power supply of the scanner with the memory card remaining attached to the card slot. In that case, after power making, the CPU 1 executes the program of FIGS. 4 and 5 (first embodiment) or that of FIGS. 9 and 10 (second embodiment). Thus, the normal program and the rewriting program in the flash memory 3 are normally rewritten.

What is claimed is:

1. A program rewriting apparatus comprising:
 a normal program storing portion for storing a normal program containing the control procedure of the equipment that incorporates the program rewriting apparatus and a spare rewriting program;
 a rewriting program storing portion for storing a rewriting program containing a reception procedure for receiving said normal program and a spare rewriting program from an external device and an overwrite procedure for overwriting said normal program and said spare rewriting program received over said normal program storing portion; and
 a control device for executing the overwrite of said normal program and said spare rewriting program in accordance with the reception and overwrite procedures of a rewriting program in a first period and for copying said spare rewriting program overwritten over said normal program storing portion to said rewriting program storing portion in accordance with said normal program in a second period different from said first period.

2. A program rewriting apparatus according to claim 1, wherein said control device sets the normal program update record in response to the completion of overwriting said normal program and said spare rewriting program.

3. The program rewriting apparatus according to claim 2, wherein said control device discriminates whether or not the normal program update record is set up and executes the overwrite of said normal program storing portion in accordance with said reception and overwrite procedures of the rewriting program on discriminating that no normal program update record is set up.

4. The program rewriting apparatus according to claim 3, wherein said control device discriminates, upon initialization of the equipment incorporating said program rewriting apparatus, whether or not said normal program update record is set up.

5. The program rewriting apparatus according to claim 1, wherein said control device sets up the rewriting program update record in response to the completion of copying of said spare rewriting program to said rewriting program storing portion.

6. The program rewriting apparatus according to claim 5, wherein said control device discriminates whether or not said rewriting program update record is set up and copies said spare rewriting program overwritten over said normal program storing portion to said rewriting program storing portion in accordance with said normal program on discriminating that no rewriting program update record is set up.

7. The program rewriting apparatus according to claim 6, wherein said control device discriminates, upon initialization of the equipment incorporating said program rewriting apparatus, whether or not the rewriting program update record is set up.

8. A program rewriting apparatus comprising:
a normal program storing portion for storing a normal program containing a control procedure of the equipment incorporating said program rewriting apparatus;
a rewriting program storing portion for storing a rewriting program containing a reception procedure for receiving said normal program from an external device and an overwrite procedure for overwriting said received normal program over said normal program storing portion; and
a control device for executing the update of the stored content of said normal program storing portion in accordance with said rewriting program and the update of the stored content of said rewriting program storing portion in different periods.

9. A program rewriting apparatus comprising:
a normal program storing portion for storing a normal program containing a control procedure of the equipment incorporating said program rewriting apparatus;
a rewriting program storing portion for storing a rewriting program containing a reception procedure for receiving said normal program from an external device and an overwrite procedure for overwriting said received normal program over said normal program storing portion; and
a control device for executing the overwrite of said normal program in accordance with said reception and overwrite procedures of the rewriting program in a first period and for receiving said rewriting program from the external device and overwriting said received rewriting program over the rewriting program storing portion in accordance with said normal program in a second period different from the first one.

10. The program rewriting apparatus according to claim 9, wherein said control device sets up the normal program update record in response to the completion of overwriting said normal program.

11. The program rewriting apparatus according to claim 10, wherein said control device receives said normal program from an external device and overwrites said received normal program over said normal program storing portion in accordance with said reception and overwrite procedures of the rewriting program on discriminating that no normal program update record is set up.

12. The program rewriting apparatus according to claim 11, wherein said control device discriminates, upon initialization of the equipment incorporating said program rewriting apparatus, whether or not the normal program update record is set up.

13. The program rewriting apparatus according to claim 9, wherein said control device sets up the rewriting program update record in response to the completion of overwriting of said rewriting program over said rewriting program storing portion.

14. The program rewriting apparatus according to claim 13, wherein said control device discriminates whether or not the rewriting program update record is set up and then receives said rewriting program from an external device and overwrites said received rewriting program over said rewriting program storing portion in accordance with said normal program on discriminating that said rewriting program update record is not set up.

15. The program rewriting apparatus according to claim 14, wherein said control device discriminates, upon initialization of the equipment incorporating said program rewriting apparatus, whether or not said rewriting program update record is set up.

16. A program rewriting apparatus comprising:
a normal program storing portion for storing a normal program containing the control procedure of the equipment incorporating the program rewriting apparatus;
a spare rewriting program storing portion for storing a spare rewriting program;
a rewriting program storing portion for storing a rewriting program containing a first rewrite procedure composed of a first reception procedure for receiving said spare rewriting program from an external device and a first overwrite procedure for overwriting said spare rewriting program received over said spare rewriting program storing portion and a second rewrite procedure composed of a second reception procedure for receiving said normal program from an external device and a second overwrite procedure for overwriting said normal program received over said normal program storing portion; and
a control device for executing the overwrite of said spare rewriting program in accordance with said first reception and said first overwrite procedures of a rewriting program in a first period and for copying said spare rewriting program overwritten over said spare rewriting program storing portion to said rewriting program storing portion in a second period different from the first one.

* * * * *